United States Patent [19]

Kita

[11] 4,138,329

[45] Feb. 6, 1979

[54] METHOD OF TREATING WASTE WATER OF A NUCLEAR POWER PLANT AND A SYSTEM THEREFOR

[75] Inventor: Norio Kita, Hitachi, Japan

[73] Assignee: Hitachi, Ltd., Japan

[21] Appl. No.: 601,070

[22] Filed: Aug. 1, 1975

[30] Foreign Application Priority Data

Aug. 16, 1974 [JP] Japan .................................. 49-93385

[51] Int. Cl.[2] .............................................. B01D 15/04

[52] U.S. Cl. ................................ 210/26; 252/301.1 W

[58] Field of Search .......................... 210/26, 71, 73 R; 176/37, 87; 252/301 W

[56] References Cited

U.S. PATENT DOCUMENTS 2,517,051 8/1950 Swenson ............................ 210/87 X

OTHER PUBLICATIONS

"Karyoku Genshiryoku Hatsuden," vol. 25, No. 2, pp. 38–39, Feb. 1974.

"Genshiryoku Kogyo," vol. 18, No. 10, p. 36, Oct. 1972.

*Primary Examiner*—Charles N. Hart

*Assistant Examiner*—E. Rollins Cross

*Attorney, Agent, or Firm*—Craig & Antonelli

[57] ABSTRACT

In a steam turbine system of a nuclear power plant which forms a closed loop, the waste water contaminated with radioactive impurities is decontaminated by means of ion exchange and heated to produce steam which is used as steam for providing a seal to the gland seal sections of the steam turbine. The steam is condensed back into water which is recirculated through the heating process.

13 Claims, 2 Drawing Figures

METHOD OF TREATING WASTE WATER OF A NUCLEAR POWER PLANT AND A SYSTEM THEREFOR

BACKGROUND OF THE INVENTION

This invention relates to a method of treating waste water of a nuclear power plant and a system adapted to carry such method into practice.

In a nuclear power plant, waste water which is commonly referred to as floor drain is produced. For example, the waste water is produced when the drain dropping onto the floor from various machines and instruments of the nuclear power plant is washed away. Such waste water carries radioactively contaminated impurities. The waste water is also produced when steam seeping through a valve and condensed back into water drops onto the floor and the floor is cleaned by washing away the leak, when machines and instruments making up the nuclear power plant are cleaned before they are repaired, and when objects, as working clothes polluted with radioactivity or radioactive impurities are cleaned or laundered. It is not permissible to allow such waste water to flow out of the nuclear power plant without giving any treatment thereto. Thus the waste water is usually treated by waste water ion-exchange treating means so as to reduce the radioactive impurities carried thereby. The waste water is supplied to a condensation storage tank after the concentration of the radioactivity carried thereby is lowered to an average of $1 \times 10^{-6}$ μci/cc by passing it through the waste water ion-exchange treating means.

Meanwhile a portion of the water flowing through the main circulation system is introduced into the condensation storage tank immediately after the water has passed through a condensation desalinator. The main circulation system constitutes a steam-feed water cycle which connects a nuclear reactor, a turbine, a condenser, a feed water pump, and a feed water heater in the indicated order, the feed water heater being connected to the nuclear reactor.

Besides being used to cope with an accident in case of emergency, the water contained in the condensation storage tank is also used for operating the control rod drive apparatus during normal operation. The water used for operating the control rod drive apparatus is returned to the nuclear reactor. The water in the condensation storage tank is also used for providing sealing steam to the gland seal sections of the turbine. More specifically, the water in the condensation storage tank is supplied to a steam generator where it is converted into steam which is supplied to the gland seal sections of the turbine. The steam passing through the gland seal sections is condensed back into water in gland steam condenser, and the water produced by condensation is returned to the condenser through a condensation recovery tank. The volume of water flowing from the main circulation system into the condensation storage tank is substantially equal to the sum of the water used for operating the control rod drive apparatus and the volume of water supplied to the steam generator. Thus the water from the main circulation system accounts for the major portion of water introduced into the condensation storage tank. Because of the fact that the water passing through the main circulation system flows into the condensation storage tank as aforesaid, the concentration of the radioactivity carried by the water in the condensation storage tank is at a level of $1 \times 10^{-4}$ μci/cc on an average.

Water which is substantially equal in volume to the waste water introduced into the condensation storage tank is withdrawn from the condensation storage tank and mixed in the sea water used in the condenser for cooling purposes. Thus the cleaning waste water is diluted and released into the sea. The water thus released into the sea carries radioactivity which has a concentration of $1 \times 10^{-9}$ μci/cc. It has been proposed at the National Academy of Sciences in the United States of America that the allowable concentration of the radioactivity carried by the sea water returned from a nuclear power plant to the sea be less than $4 \times 10^{-9}$ μci/cc. In recent years, 10 CFR 50 Appendix 1 which is a law of the United States of America has set the goal of reducing a dose of radiation from the radioactive gas to less than 1/100 of the prevailing value at the boundary of the site. As to the radioactive liquid, it is stipulated that a dose of radiation therefrom be less than 5 ci (except for tritium) per year.

Vigorous attempts have hitherto been made to demand that radioactive effluents from a nuclear power plant be reduced. It is likely that the demand of this nature would increase in intensity in the future as the people in general pay increasingly greater attention to nuclear power plants as a source of power supply.

SUMMARY OF THE INVENTION

An object of the present invention is to effectively reduce the concentration of the radioactivity carried by the waste water produced in a nuclear power plant.

The outstanding characteristic of the present invention is that radioactively contaminated waste water that has passed through waste water ion-exchange treating means is vaporized to produce steam which is supplied to the gland seal sections of a turbine provided in the steam-feed water cycle so that the steam may perform the function of providing a seal to the gland seal sections, the steam thereafter being condensed back into water and mixed in the cooling water for a condenser mounted in the steam-feed water cycle, so that the waste water can be released to the outside together with the cooling water for the condenser.

The invention offers the advantage of markedly lowering the concentration of the radioactivity carried by the waste water produced in a nuclear power plant before being released to the outside.

DESCRIPTION OF THE PREFERRED EMBODIMENT

Figure 1:
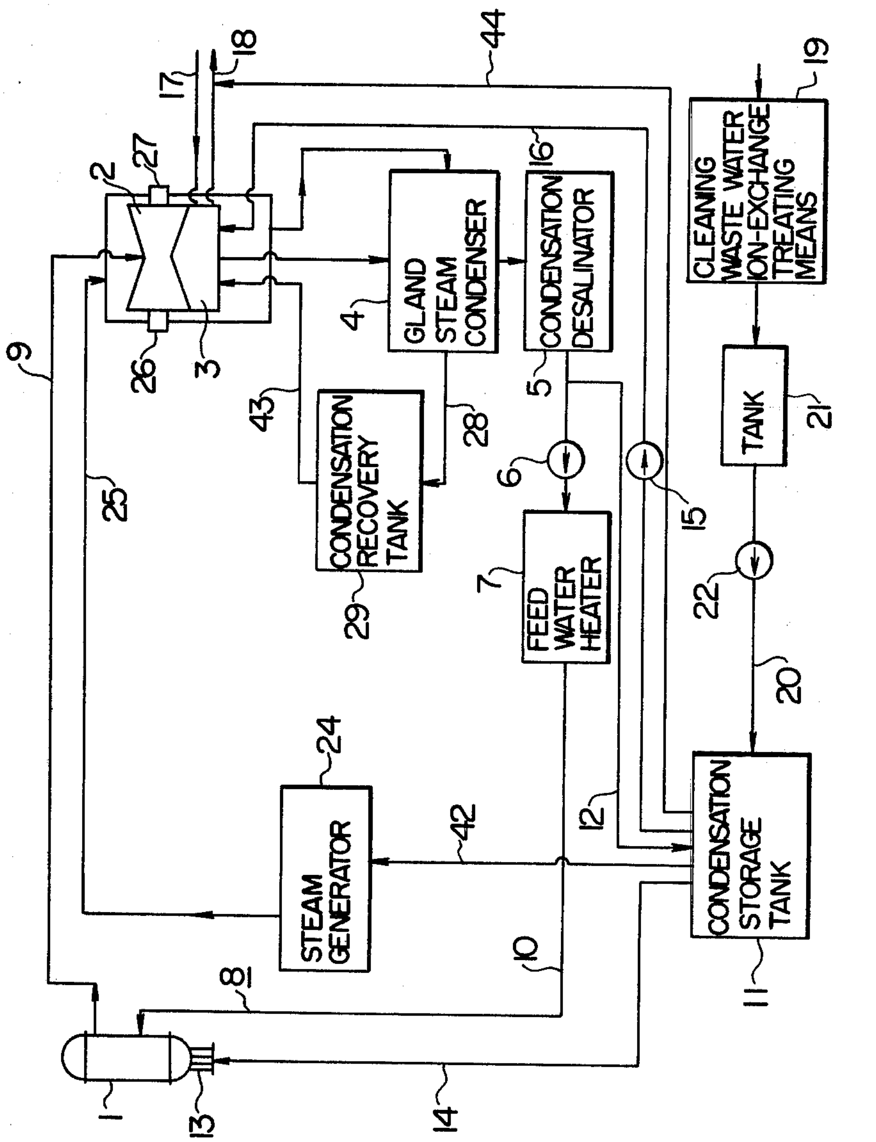
FIG. 1 is a flow sheet showing the prior art.

Before describing the present invention, the prior art will be summarized with reference to FIG. 1 in which a main circulation system generally designated 8 has mounted therein a nuclear reactor 1, a turbine 2, a condenser 3, a gland steam condenser 4, a condensation desalinator 5, a feed water pump 6 and a feed water heater 7 which are disposed in the indicated order, the feed water heater 7 being connected to the nuclear reactor 1. The main circulation system 8 comprises a main steam line 9 connecting the nuclear reactor 1 to the turbine 2 and a feed water line 10 connecting the condenser 3 to the nuclear reactor 1.

A conduit 12 connects a point in the water feed line 10 between the condensation desalinator 5 and the feed water pump 6 to a condensation storage tank 11 which is connected through a conduit 14 to a control rod drive apparatus 13 to supply water to operate the apparatus. A water replenishing conduit 16 mounting a water replenishing pump 15 therein connects the condensation storage tank 11 to the condenser 3. A sea water supply conduit 17 for supplying sea water as a coolant and a sea water release conduit 18 which passes through the condenser 3 for returning the sea water to the sea are connected to the condenser.

Cleaning waste water ion-exchange treating means 19 is connected to the condensation storage tank 11 through a conduit 20 which mounts a tank 21 and a pump 22 therein. The condensation storage tank 11 is connected through a conduit 42 to a steam generator 24 which is connected through a conduit 25 to gland seal sections 26 and 27 of the turbine 2 to supply steam thereto. The steam which is supplied to the gland seal sections 26 and 27 passes through the gland steam condenser 4 and is introduced into a condensation recovery tank 29 which is connected to the condenser 3 through a conduit 43. The condensation storage tank 11 is connected to the sea water release conduit 18 through a conduit 44.

Figure 2:
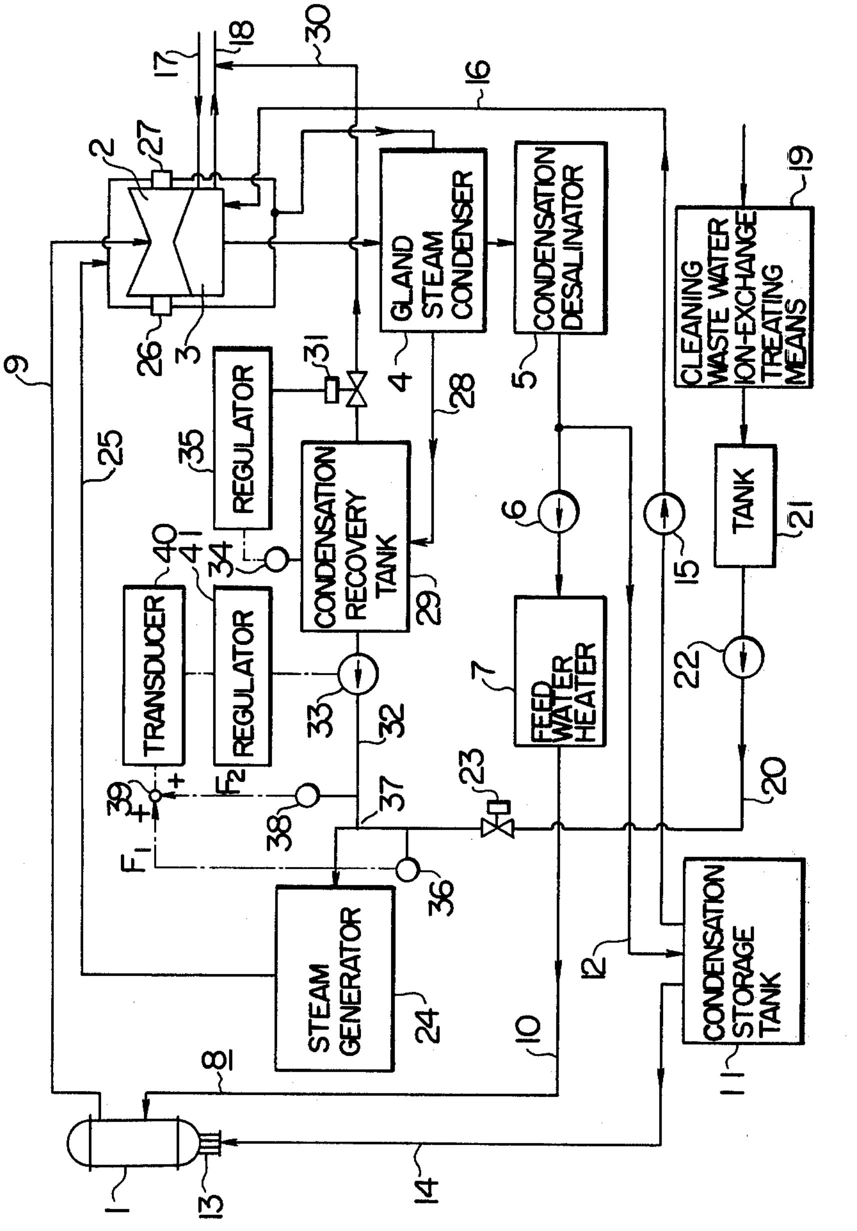
FIG. 2 is a flow sheet showing one embodiment of the present invention.

A preferred embodiment of the invention will now be described which differs from the prior art. In the embodiment of the invention shown in FIG. 2, the cleaning waste water ion-exchange treating means 19 is connected to the steam generator 24 through the conduit 20 which mounts therein a valve 23 as well as the tank 21 and pump 22. The conduit 25 connecting the steam generator 24 to the turbine 2 branches off at the turbine end and is connected to the gland seal sections 26 and 27 of the turbine 2. Thus conduit 20 is connected to conduit 25 through the steam generator 24. A conduit 28 which branches off at one end to be connected to the gland seal sections 26 and 27 is connected at the other end to the condensation recovery tank 29 through the gland steam condenser 4. A conduit 30 connected at one end to the condensation recovery tank 29 is connected at the other end to the sea water release conduit 18 through a control valve 31. In place of using conduit 30, the conduit 28 connecting the gland steam condenser 4 to the condensation recovery tank 29 may be connected to the sea water release conduit 18. The condensation recovery tank 29 is connected to conduit 20 through a conduit 32 which mounts a pump 33 therein.

The steam generated in the nuclear reactor 1 is supplied through the main steam line 9 to the turbine 2 and cooled at the condenser 3 by the sea water supplied through the sea water supply conduit 17, so that the steam is condensed back into water which is passed through the feed water line 10 and the gland steam condenser 4 to the condensation desalinator 5 where impurities and radioactive substances are removed from the water. After being treated at the condensation desalinator 5, the water is pressurized by the feed water pump 6 and passed through the feed water heater 7 before being returned to the nuclear reactor 1. Thus the main circulation system 8 consists of a portion through which steam flows and a portion through which water flows. The main circulation system 8 constitutes what is referred to as a steam-feed water cycle of the closed loop.

Water is stored in the condensation storage tank 11 to cope with an accident in case of emergency. A portion of the water passing through the main water supply line 10 is supplied to the condensation storage tank 11 through conduit 12. The water in the condensation storage tank 11 is supplied through conduit 14 to the control rod drive apparatus 13 to operate the same. The water supplied from the condensation storage tank 11 to the control rod drive apparatus 13 is returned to the nuclear reactor 1. In the event the water in the main circulation system 8 becomes small in volume, the water replenishing pump 15 is actuated so as to introduce an additional supply of water from the condensation storage tank 11 to the condenser 3 through the water replenishing conduit 16.

The cleaning waste water produced in the nuclear reactor plant is treated at the waste water ion-exchange treating means 19 so that impurities may be removed therefrom. This results in the concentration of the radioactivity carried thereby being reduced to as low as $1 \times 10^{-6}$ $\mu$ci/cc. The waste water treated in this way is stored in the tank 21 and supplied therefrom by pump 22 through conduit 20 to the steam generator 24 where the waste water is converted into steam. Steam is extracted from the main steam line 9 through a conduit (not shown) and used as a heating medium for heating the steam generator 24. The steam produced at the steam generator 24 carries radioactivity whose concentration is $1 \times 10^{-8}$ || ci/cc which is very low. The steam produced in this way is supplied through conduit 25 to the gland seal sections 26 and 27 of the turbine 2.

A very small volume of this steam flows into the turbine 2. Meanwhile nearly all the steam supplied to the gland seal sections 26 and 27 is introduced through conduit 28 into the gland steam condenser 4 where it is cooled by the water supplied from the condenser 3 and condensed back into water which is supplied to the condensation recovery tank 29. The condensation recovery tank 29 has mounted therein a liquid level meter 34 which produces a liquid level signal which is supplied to a regulator 35. The regulator 35 supplies a signal to the control valve 31 whose degree of opening is regulated such that the liquid level in the condensation recovery tank 29 remains constant. More specifically, when the liquid level in the condensation recovery tank 29 rises above a predetermined level, the control valve 31 opens to allow the water contained in the condensation recovery tank 29 to move through conduit 30 and to be mixed in the sea water flowing through the sea water release conduit 18. The concentration of the radioactivity carried by the water before being mixed in the sea water is $1 \times 10^{-8}$ $\mu$ci/cc which is reduced to as low as $1 \times 10^{-13}$ $\mu$ci/cc after being mixed in the sea water.

The waste water is not produced continuously in a nuclear power plant, nor is its yield constant. Prolonged holding of the quantity of the waste water supplied to the tank 21 at a level which is lower than the level required for generating steam in a volume necessary for supplying sealing steam to the gland seal sections will create a situation in which the liquid level in the tank 21 is lowered. If this situation is allowed to continue, the tank 21 will finally run out of the cleaning waste water stored therein for supplying waste water to the steam generator 24. The occurrence of this dangerous situation can be avoided as set forth hereinafter.

Let us assume that a liquid level meter, not shown, which is capable of continuously measuring the liquid level is mounted in the tank 21. The pump 22 is controlled such that, if the liquid level in the tank 21 is lowered as aforementioned and a signal indicating the position of the liquid level as measured by the liquid level meter (hereinafter referred to as a liquid level signal) indicates a value which is less than a preset value (hereinafter referred to as an upper set value), the number of revolutions of the pump 22 will be reduced in accordance with the liquid level signal. If the liquid level is further lowered and a value indicated by a liquid level signal reaches a preset value which is lower than the upper set value (hereinafter referred to as a lower set value), the operation of the pump 22 will be stopped.

That is, when the values indicated by liquid level signals are in a range above the upper set value, the pump 22 rotates at its rated number of revolutions, thereby supplying to the steam generator 24 a volume of cleaning waste water which is sufficiently large to generate steam in a quantity necessary for providing a seal to the gland seal sections of the turbine. When the values indicated by liquid level signals are in a range between the upper and lower set values, the number of revolutions of the pump 22 is regulated in accordance with the liquid level signals. If the values indicated by liquid signals gradually decrease from the upper set value toward the lower set value, then the number of revolutions of the pump 22 gradually decreases and the volume of the cleaning waste water delivered by the pump 22 is reduced accordingly. Upon the value indicated by a liquid level signal reaching the lower set value, the operation of the pump 22 is stopped, thereby cutting off the supply of the cleaning waste water from the tank 21 to the steam generator 24. The valve 23 is controlled such that when the pump 22 is shut off the valve 23 is brought to a fully closed position, with the valve 23 being in a fully open position when the pump 22 is in operation.

If the cleaning waste water supplied from the tank 21 to the steam generator decreases in volume; then water corresponding in volume to the decrease in the supply of cleaning waste water is supplied from the condensation recovery tank 29 to conduit 20 through a junction 37 of conduits 32 and 20. That is, a reduction in the volume of the waste water in the tank 21 is compensated for by the supply of water from the condensation recovery tank 29. Thus water is supplied at all times to the steam generator 24 in a volume sufficiently great to generate steam in a quantity which is sufficiently high to supply necessary steam to the gland seal sections of the turbine.

Means for achieving this result will be described in detail. A flow meter 36 is mounted in a portion of conduit 20 between the check valve 23 and the junction 37 while another flow meter 38 is mounted in a portion of conduit 32 between the pump 33 and the junction 37. A flow rate signal $F_1$ produced by flow meter 36 and a flow rate signal $F_2$ produced by flow meter 38 are transmitted to an adder 39 which produces a signal $(F_1 + F_2)$ which in turn is supplied through a transducer 40 to a regulator 41. The regulator 41 operates such that it regulates the number of revolutions of the pump 33 to keep constant the signal $(F_1 + F_2)$ produced by the adder 39.

In the embodiment shown and described hereinabove, the present invention is described as being applied to a boiling-water reactor. It is to be understood that the invention can have application in other reactors as well, such as a pressurized-water reactor and a high speed or fast breeder reactor.

I claim:

1. A method of treating waste water of a nuclear power plant including a steam turbine system constituting a closed loop, comprising the steps of:
   (a) subjecting the waste water polluted with radioactivity to an ion-exchange treatment to lower the concentration of radioactive substances contained therein;
   (b) heating the waste water to generate steam after the waste water is treated;
   (c) supplying the steam obtained in step (b) to the gland seal sections of the turbine to provide a seal thereto;
   (d) condensing the steam back into water; and
   (e) recirculating independently of said closed loop at least a portion of the water obtained in step (d) as feed water for generating the steam in step (b).

2. A method as claimed in claim 1 further comprising the step of regulating the volume of the independently recirculated water in step (e) in response to the volume of the waste water supplied after being subjected to the ion-exchange treatment in step (a), said independently recirculated water being obtained by condensing the steam in step (d).

3. A method as claimed in claim 2 further comprising the step of releasing from the system at least a second portion of the water obtained by condensation in step (d) in response to the volume of the water obtained by condensing the steam.

4. A system for treating waste water of a nuclear power plant comprising:
   a turbine and a first condenser mounted in a steam-feed water cycle constituting a closed loop;
   a steam generator receiving a supply of the waste water after the waste water is treated by ion-exchange treating means;
   a conduit for supplying therethrough to gland seal sections of said turbine the steam generated by said steam generator;
   a second condenser for condensing back into water the steam which has passed through the gland seal sections; and
   a conduit for recirculating therethrough to said steam generator independently of said closed loop at least a portion of the water obtained by condensing the steam by said second condenser.

5. A system as defined in claim 4 further comprising a plurality of flow meters, one for measuring the flow rate of the waste water after the waste water is treated by ion-exchange and the other for measuring the flow rate of the independently recirculated water which is obtained by condensing the steam; and means for regulating the volume of the independently recirculated water which is obtained by condensing the steam, whereby the value obtained by adding the two flow rates can be kept constant.

6. A system as claimed in claim 5 further comprising means for releasing excess water from the system when the volume of water produced by condensing the steam by said second condenser exceeds the volume of water which needs to be supplied to said steam generator.

7. A method according to claim 2, wherein said step of regulating includes maintaining substantially constant the sum of the flow rates of the waste water supplied after said step (a) and the independently recirculated water of said step (e).

8. A method according to claim 1, wherein said steps (a) through (e) are carried out substantially separately of said closed loop.

9. A method of treating waste water contaminated with radioactive impurities in a nuclear power plant which includes a closed loop system having a steam turbine, said method comprising the steps of:

(a) decontaminating the radioactive impurities in the waste water through an ion-exchange treatment;

(b) storing the decontaminated waste water separately from the closed loop system;

(c) feeding the stored decontaminated waste water directly to a steam generator;

(d) heating the fed decontaminated waste water to generate steam;

(e) supplying the steam to gland seal sections of the steam turbine to effect sealing;

(f) condensing the steam passed by the gland seal sections back into water;

(g) storing the condensate; and (h) recirculating independently of said closed loop system at least a portion of the stored condensate to the steam generator for generating steam, said independently recirculated condensate having a flow rate being controlled so as to keep the sum of the flow rate of the independently recirculating condensate and the flow rate of the fed decontaminated waste water substantially constant.

10. A method according to claim 7, further comprising the step of discharging the remaining portion of the stored condensate from the system so as to keep the stored condensate at a predetermined level.

11. A method as claimed in claim 1, further comprising the step of directly circulating said waste water from said ion-exchange treatment in step (a) to a steam generator for carrying out step (b).

12. A method as claimed in claim 1, wherein said steam turbine system includes a steam turbine and at least a first condenser.

13. A method of treating contaminated waste water of a nuclear power plant which includes a closed loop system with a steam turbine, said method comprising the steps of:

(a) heating water by a heater to generate steam independently of a condensation storage tank of the closed loop after said water is treated by removing radioactive impurities from waste water containing said radioactive impurities;

(b) supplying said steam to gland seal sections of the steam turbine;

(c) condensing said steam after being supplied to said gland seal sections;

(d) recycling the condensate obtained in step (c) to said heater; and (e) controlling the flow rate of said condensate in such a manner that, when the flow rate of the water supplied to the heater does not reach a predetermined level after the radioactive impurities are removed from the water, the shortage is replenished by said condensate so as to maintain a constant volume of water in said heater.

* * * * *